United States Patent [19]

Thompson

[11] Patent Number: 4,783,497

[45] Date of Patent: Nov. 8, 1988

[54] WATER-BASED POLYESTER COATING COMPOSITIONS CONTAINING AN ALKYLATED AMINO RESIN

[75] Inventor: Gerald L. Thompson, Chesterfield County, Va.

[73] Assignee: Reynolds Metals Company, Richmond, Va.

[21] Appl. No.: 809,260

[22] Filed: Dec. 16, 1985

[51] Int. Cl.$^4$ .................... C08K 5/05; C08L 77/12
[52] U.S. Cl. .................... 524/391; 524/475; 524/487; 524/538; 524/539; 524/542; 525/425; 525/443
[58] Field of Search ............... 524/538, 539, 389, 391, 524/542, 475; 525/425, 443

[56] References Cited

U.S. PATENT DOCUMENTS

| | | | |
|---|---|---|---|
| 3,576,775 | 4/1971 | Jaegersberg | 260/21 |
| 3,660,329 | 5/1972 | Wysocki | 260/22 CQ |
| 3,734,873 | 5/1973 | Anderson et al. | 260/29.6 H |
| 3,779,993 | 12/1973 | Kibler et al. | 524/45 |
| 3,907,736 | 9/1975 | Barton | 260/29.4 R |
| 4,148,779 | 4/1979 | Blackwell et al. | 260/40 R |
| 4,204,014 | 5/1980 | Dörffel et al. | 427/385.5 |
| 4,304,901 | 12/1981 | O'Neill et al. | 528/290 |
| 4,335,220 | 6/1982 | Coney | 523/414 |
| 4,402,748 | 9/1983 | Killat et al. | 106/20 |
| 4,430,368 | 2/1984 | Garland | 427/385.5 |
| 4,508,570 | 4/1985 | Fujii et al. | 106/20 |

FOREIGN PATENT DOCUMENTS

| | | |
|---|---|---|
| 144421 | 6/1979 | Fed. Rep. of Germany . |
| 56-115371 | 2/1980 | Japan . |
| 2044780 | 10/1980 | United Kingdom . |

OTHER PUBLICATIONS

Eastman ® AQ29, 38 and 55 Polymers for Use in Water-Based Inks, Jun., 1985, Eastman Chemical Products, Inc.

*Primary Examiner*—Theodore E. Pertilla
*Attorney, Agent, or Firm*—Alan T. McDonald

[57] ABSTRACT

Coating compositions suitable for use as coatings or inks for metallic foils, such as aluminum foil, as well as for use on other materials, such as papers and plastics resin films, are disclosed. These compositions comprise a water dispersable polyester resin, an alkylated amino resin and water. They may optionally include a pigment and other optional modifying ingredients. These compositions, being water-based, provide improved environmental compatibility and may be dried under relatively low temperatures without objectional ammonia residue odor.

11 Claims, No Drawings

WATER-BASED POLYESTER COATING COMPOSITIONS CONTAINING AN ALKYLATED AMINO RESIN

BACKGROUND OF THE INVENTION

The use of metallic foils, such as aluminum foil, as a packaging material requires that coatings and/or inks be applied to the surface of the foil, either to protect the foil or to provide a decorative surface.

Traditionally, clear coatings and inks for such purposes have been organic solvent-based. With increased environmental concerns, there is a need to replace these organic solvent-based inks and coatings with water-based materials.

While water-based inks and coatings for metallic foils are available, they are not without problems. Such materials require higher drying temperatures and/or increased drying times than the more traditional organic solvent-based materials. If sufficient drying of the known water-based inks and coatings does not occur, unacceptably objectional ammonia residue odor remains. This has proved to be an especially difficult problem for older coating and printing lines, which were not designed for the temperatures and drying times required by such water-based inks and coatings.

Another problem with water-based inks and coatings for metallic foils is their relatively low water resistance when dried. Since foil packaging materials must be compatable with food products, the low water resistance of known water-based inks and coatings makes them unacceptable for such purposes.

It is thus a primary objective of the present invention to provide a water-based ink or coating composition which has the required adhesion, flexibility, water resistance and low odor to be an acceptable material for coating onto metallic foils.

THE PRESENT INVENTION

By means of the present invention, this desired goal has been obtained.

The present invention comprises a water-based ink or coating composition for metallic foils, such as aluminum foil. While described primarily for use on metallic foils, the ink or coating composition of the present invention may also be used on other materials, such as paper and plastics resin films. The composition comprises a water dispersible polyester resin, an alkylated amino resin and water. Optionally, a pigment, as well as other modifying agents, may be present. These inks and coatings are able to be dried in shorter times and at lower temperatures than other known water based inks without objectionable ammonia odor residue and provide improved water resistance properties when dried.

DETAILED DESCRIPTION OF THE PREFERRED EMBODIMENTS

The coating compositions of the present invention have three required components, a water dispersible polyester resin, an alkylated amino resin and water. If the composition is to be employed as an ink, rather than as a clear coating, a pigment is also necessary.

The water dispersible polyester resin is a polyester or polyester amide derived from monomer components which include dicarboxylic acid, hydroxycarboxylic acid, aminocarboxylic acid, aminoalcohol, glycol, diamine or combinations of such monomer components, wherein at least a part of the total of all such monomer components is a poly(ethylene glycol), and at least a part of said total is one or more of said monomer components substituted with one or more sulfonate metal salt groups. The preparation of these polyesters and polyester amides is disclosed in U.S. Pat. No. 3,779,993, the disclosure of which is incorporated herein by reference. The polyesters may be present in the coating compositions of the present invention in an amount from about 10 to about 50% by weight of the coating composition. Suitable polyesters of this class are sold under the trade names AQ29, AQ38 and AQ55 by Eastman Chemical Products, Inc.

The polyester component of the coating composition aids in film formation and provides adhesion and flexibility properties to the composition.

The second required component of the coating compositions of the present invention is an alkylated amino resin. This amino resin may be a partially alkylated amino resin, a highly alkylated amino resin with high amine content or a highly alkylated amino resin with low amine content. Suitable alkylated amino resins include hexamethoxymethyl melamine, methylated melamine and butylated melamine. Suitable alkylated amino resins are sold under the trade names Cymel 303, Cymel 373 and Cymel 385 from American Cyanamid Company. The alkylated amino resin may be present in an amount from about 1 to about 15% by weight of the coating composition. This component provides water resistance to the coating when dried.

A reaction catalyst may be employed to enhance the curing of the alkylated amino resin component. For example, an alkyl sulfonic acid catalyst, sold by American Cyanamid under the trade name Cycat 600 may be employed. When present the catalyst may comprise up to about 1% by weight of the coating composition.

The final required component for the coating compositions of the present invention is water. Preferably, deionized water is employed to prevent resin precipitation by multivalent cations which are often found in "hard" water. The water component may be present in an amount from about 50 to about 90% by weight of the coating composition and acts as the medium for the composition and provides vicosity control.

If the coating composition is to be employed other than as a clear protective coating, i.e., as an ink formulation, a pigment is employed to provide color. Most organic and inorganic pigments may be employed in the compositions of the present invention. Examples of such suitable pigments include phthalo blue, red lake c, naphthol red, yellow HR, phthalo green and titanium oxide. The pigment may be provided in an amount up to about 25% by weight of the coating composition.

Other optional modifying agents may be included in the compositions of the present invention. A low boiling point alcohol, such as methanol, ethanol, isopropanol or n-propyl alcohol may be employed in an amount up to about 20% by weight of the coating composition. When employed, the alcohol provides wettability of the coating composition to the metallic foil or plastics resin film substrate.

Surface modifying agents, such as a sequestered paraffin or a silicone emulsion may be provided, each in an amount up to about 20% by weight of the coating composition. Such surface modifying agents may be employed for improved stuff resistance, or to reduce the coefficient of friction for increased slip.

Finally, other processing aids, such as pigment dispersing aids, including such materials as Aerosol OT, a sodium dioctyl sulfosuccinate surfactant, from American Cyanamid or defoaming agents, such as Foamkill 614 from Crusable Chemical Company, may be employed. When employed, such processing aids each may comprise up to abut 1% by weight of the coating composition.

EXAMPLES

Comparative examples were conducted to determine the adhesion, flexibility and water resistance properties of the compositions of the present invention with other compositions employing the water dispersible polyester resins.

In all of the following examples, the prepared composition was coated on to aluminum foil and passed through a drying oven maintained at a temperature of 250° F. with a 2.5 second dwell time in the oven.

EXAMPLES 1-3

In these examples, the water dispersible polyester resin was supplied as Eastman AQ29 and was mixed with a polyvinyl chloride-polyvinylidine chlorideacrylate copolymer dispersion, Haloflex 202, from ICI Americas.

| Example No. | Components | Percent by Weight |
| --- | --- | --- |
| 1 | Eastman AQ29 | 27 |
|   | Haloflex 202 | 10 |
|   | Water | 63 |
| 2 | Eastman AQ29 | 24 |
|   | Haloflex 202 | 20 |
|   | Water | 56 |
| 3 | Eastman AQ29 | 21 |
|   | Haloflex 202 | 30 |
|   | Water | 49 |

The three compositions were tested for adhesion to the foil, flexibility and water resistance. Adhesion and flexibility were both good in all three instances, but water resistance was consistently poor among the compositions.

EXAMPLES 4 AND 5

In Examples 4 and 5, the water dispersible polyester resin, in this case Eastman AQ55, was mixed with a pigment and an 80% by weight water and 20% by weight isopropyl alcohol solvent.

| Example No. | Components | Percent by Weight |
| --- | --- | --- |
| 4 | Eastman AQ55 | 18.75 |
|   | American Hoechst 11-1424 yellow HR-02 pigment. | 6.25 |
|   | water | 60.00 |
|   | isopropyl alcohol | 15.00 |
| 5 | Eastman AQ55S | 18.75 |
|   | Harshaw 1336 red lake c pigment | 6.25 |
|   | water | 60.00 |
|   | isopropyl alcohol | 15.00 |

These compositions were tested in the same manner for adhesion, flexibility and water resistance. Again, adhesion and flexibility were good, but water resistance was poor.

EXAMPLES 6-8

In these examples, which were prepared according to the teachings of the present invention, the water dispersible polyester resin was mixed with an alkylated amino resin, either Cymel 303 or Cymel 385, ethanol and, in the case of Example 8, an alkyl sulfonic acid catalyst, Cycat 600 from American Cynamid.

| Example No. | Components | Percent by Weight |
| --- | --- | --- |
| 6 | Eastman AQ29 (blue tint) | 7.1 |
|   | Eastman AQ29 (clear) | 12.6 |
|   | Ethanol | 9.4 |
|   | Cymel 303 | 4.7 |
|   | Water | 66.2 |
| 7 | Eastman AQ29 (blue tint) | 7.1 |
|   | Eastman AQ29 (clear) | 12.6 |
|   | Ethanol | 9.4 |
|   | Cymel 385 | 4.7 |
|   | Water | 66.2 |
| 8 | Eastman AQ29 (blue tint) | 7.0 |
|   | Eastman AQ29 (clear) | 12.6 |
|   | Ethanol | 9.4 |
|   | Cymel 303 | 4.7 |
|   | Cycat 600 | 0.5 |
|   | Water | 65.8 |

The compositions of Examples 6-8 were tested in the same manner as above for adhesion, flexibility and water resistance. Adhesion and flexibility were good and, unlike the previous compositions, water resistance was also good.

The comparative examples illustrate that the compositions of the present invention provide superior water resistance to water-based coatings formed from water dispersible polyester resins than those employing other known materials for water resistance.

From the foregoing, it is clear that the present invention provides an ink system with improved properties.

While the invention has been described with reference to certain specific embodiments thereof, it is not intended to be so limited thereby, except as set forth in the accompanying claims.

I claim:

1. A coating composition consisting essentially of from about 10 to about 50 percent by weight of a polyester or polyester amide derived from monomer components which include dicarboxylic acid, hydroxycarboxylic acid, aminocarboxylic acid, aminoalcohol, glycol, diamine or combinations of such monomer components, wherein at least a part of the total of all such monomer components is a poly(ethylene glycol), and at least a part of said total is one or more of said monomer components substituted with one or more sulfonate metal salt groups, from about 1 to about 15 percent by weight of an alkylated amino resin and from about 50 to about 90 percent by weight water.

2. The coating composition of claim 1 wherein said alkylated amino resin is selected from a member of the group consisting of partially alkylated amino resins, highly alkylated amino resins with high amine content and highly alkylated amino resins with low amine content.

3. The coating composition of claim 2 wherein said alkylated amino resin comprises hexamethoxymethyl melamine, methylated melamine or butylated melamine.

4. The coating composition of claim 1 further consisting essentially of up to about 1 percent by weight of a catalyst.

5. The coating composition of claim 4 wherein said catalyst comprises an alkyl sulfonic acid catalyst.

6. The coating composition of claim 1 wherein said coating composition is in the form of an ink and further consists essentially of up to about 25 percent by weight of a pigment.

7. The coating composition of claim 6 further consisting essentially of up to about 1 percent by weight of a pigment dispersing aid.

8. The coating composition of claim 1 further consisting essentially of up to about 20 percent by weight of a low boiling point alcohol.

9. The coating composition of claim 8 wherein said low boiling point alcohol comprises methanol, ethanol, isopropanol or n-propyl alcohol.

10. The coating composition of claim 1 further consisting essentially of up to about 20 percent by weight of a surface modifying agent.

11. The coating composition of claim 10 wherein said surface modifying agent comprises a sequestered paraffin or a silicone emulsion.

* * * * *